United States Patent [19]

Lee

[11] Patent Number: 5,652,633

[45] Date of Patent: Jul. 29, 1997

[54] LIQUID CRYSTAL DISPLAY DEVICE WITH IMPROVED CROSSOVER PORTION AND METHOD OF FORMING THE SAME

[75] Inventor: Jae Kyun Lee, Pusan-si, Rep. of Korea

[73] Assignee: LG Electronics Inc., Seoul, Rep. of Korea

[21] Appl. No.: 621,942

[22] Filed: Mar. 26, 1996

[30] Foreign Application Priority Data

Jan. 15, 1996 [KR] Rep. of Korea .................. 675/1996

[51] Int. Cl.⁶ .................. G02F 1/136; G02F 1/141; H01L 29/04
[52] U.S. Cl. .................. 349/42; 349/143; 257/59
[58] Field of Search .................. 359/59, 54, 61; 257/59, 72

[56] References Cited

U.S. PATENT DOCUMENTS

| 4,902,638 | 2/1990 | Muto ................................. 359/59 |
| 4,907,861 | 3/1990 | Muto ................................. 359/59 |
| 5,076,666 | 12/1991 | Katayama et al. .......................... 359/59 |
| 5,473,452 | 12/1995 | Shin ................................. 359/59 |
| 5,535,028 | 7/1996 | Bae et al. ................................. 359/59 |

FOREIGN PATENT DOCUMENTS

| 0 266 252 | 5/1988 | European Pat. Off. . |
| 1-239530 | 9/1989 | Japan . |

*Primary Examiner*—Anita Pellman Gross
*Assistant Examiner*—Toan Ton

[57] ABSTRACT

A liquid crystal display device includes a first signal line formed on a substrate in one direction, a second signal line insulated from and crossing over the first signal line, and a plurality of parts projecting from the first signal line at the crossover portion, whereby the liquid crystal display device can effectively prevent the severance of the first signal line due to seepage of etchant, stress due to metal defects, and stress due to thermal expansion and thermal contraction.

23 Claims, 3 Drawing Sheets

LIQUID CRYSTAL DISPLAY DEVICE WITH IMPROVED CROSSOVER PORTION AND METHOD OF FORMING THE SAME

BACKGROUND OF THE INVENTION

1. Field of the Invention

The present invention relates to an improved liquid crystal display device and more particularly, to a liquid crystal display device including an improved crossover portion whose structure prevents disconnections in signal lines.

2. Description of Related Art

Generally, a liquid crystal display (LCD) device includes a bottom plate having a plurality of thin film transistors (TFTs) and a plurality of pixel electrodes disposed thereon, a top plate composed of common electrodes and a color filter for displaying color, a liquid crystal (LC) layer disposed between the top and bottom plates, and a pair of polarizers located on the top and bottom surfaces of the device for selectively transmitting light.

As shown in FIG. 1, a conventional liquid crystal display device comprises a bottom plate containing a thin film transistor (TFT) and a pixel electrode. The bottom plate includes a plurality of gate lines 1 arranged to transmit data signals to the pixel electrode through the TFT and a plurality of data lines 2 crossing the gate lines 1 perpendicularly. As a result, a plurality of spaces are formed between the gate lines 1 and data lines 2. Accordingly, each space formed between the two gate lines and two data lines becomes a pixel region. Each pixel region forms a TFT with the gate line functioning as a gate electrode, the data line functioning as a source electrode, and a drain electrode connected to a pixel electrode.

As shown in FIGS. 2 and 3, the gate line 1 is first formed on the insulator substrate for driving the TFT, the data line 2 is formed thereon perpendicular to the gate line 1 for supplying the data signal to the TFT, and the pixel electrode 4 is formed in the pixel region. As a result, the gate line 1 and data line 2 are provided with a crossover portion A where the data line 1 crosses over the gate line 1.

The liquid crystal display device of the conventional art is prepared by the following process. First, a metal material, such as Al, is deposited to form a first metal layer. Then the first metal layer is selectively patterned using photolithography and etching to form the gate line 1. On the top surface of the formed substrate, a gate insulator layer (not shown) is formed and a semiconductor layer 5 is formed on the active region of the TFT. Then a second metal layer having a metal material, such as Cr, is deposited on the top surface of the formed substrate, and the data line 2 and the drain electrode 3 are formed by selectively removing the second metal layer using photolithography and etching. Finally, the pixel electrode 4 is formed in the pixel region so as to provide connection to the drain electrode 3.

However, such conventional liquid crystal display devices as shown in FIGS. 1 to 3 suffer from a number of problems. For example, since the gate lines and data lines are composed of metal and are formed on a glass or quartz substrate, data or signal lines receive stress due to defects in the metal material and its structure, and due to differences in thermal expansion coefficient. This stress is prominent in the direction that the data lines extend. As a result, the data lines can be easily severed or disconnected.

Additionally, when a metal layer is deposited on the substrate, the deposited layer is selectively patterned to form the data line using photolithography and etching. As a result, the data line crosses over the gate line and step coverage is formed at the crossover portion, i.e. a difference in the position of the data line is formed where the data line crosses over an edge of the gate line. However, due to the step coverage, less metal material is deposited at the crossover portion, especially along the edges of the gate line. Consequently, etchant (etching liquid) seeps into the data line along the two edges of the gate line at the crossover portion.

Accordingly, as shown in FIG. 3, the etchant can seep into the data line 2 as much as the width of the data line 2, causing severance as shown in B. If this occurs, then the data line 12 will be severed. But, even if only the small amount of etchant is seeped, due to line stress in the direction of the data line the severance of the data line may result.

SUMMARY OF THE INVENTION

Accordingly, it is an object of the present invention to provide an improved liquid crystal display device which eliminates the above problems encountered with conventional liquid crystal display devices.

Another object of the present invention is to provide a liquid crystal display device comprising an improved crossover portion of a gate line and a data line for preventing disconnection in the data line.

A further object of the present invention is to provide a liquid crystal display device comprising: a first conductor formed in a first direction and a second conductor disposed over the first conductor in a second direction, forming a crossover portion, wherein the first conductor includes preventing means for preventing disconnection of the second conductor at the crossover portion, wherein the first and second conductors form a conductor pair, and wherein the device includes at least one such conductor pair.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention is also directed to, in a liquid crystal display device having at least one pair of first and second partially overlapping conductors, a method of configuring an edge of the first conductor where the first conductor is overlapped by the second conductor, the method comprising configuring, for at least one pair of first and second partially overlapping conductors, at least one edge of the first conductor such that a portion of the edge is nonperpendicular to the overlapping second conductor where the first conductor is overlapped by the second conductor.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
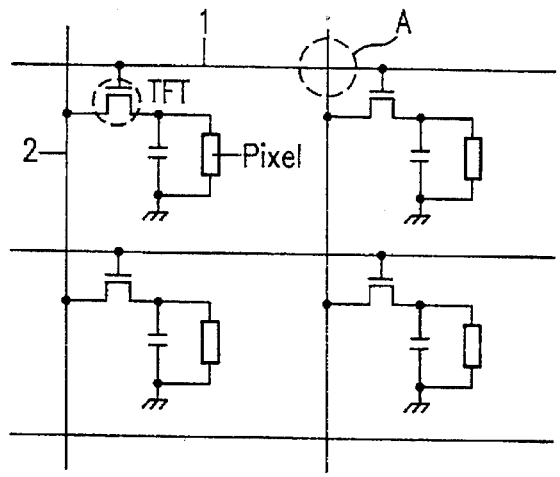
FIG. 1 is a circuit schematic of a conventional liquid crystal display device.
Figure 2:
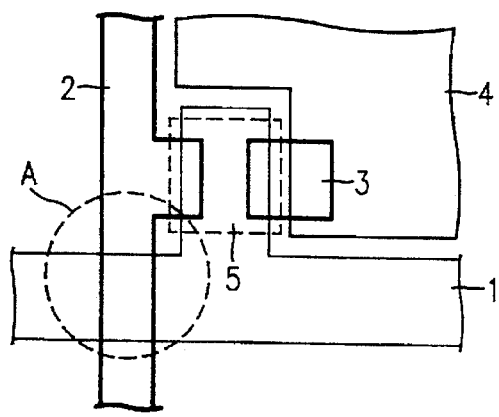
FIG. 2 is a layout view of a portion of a conventional crystal display device.
Figure 3:
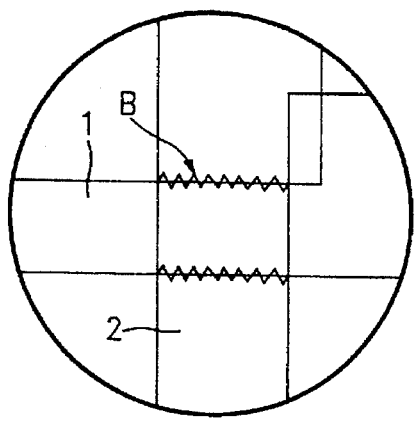
FIG. 3 is an enlarged view of a crossover portion A of a gate line and a data line of the conventional display device shown in FIGS. 1 and 2.
Figure 4:
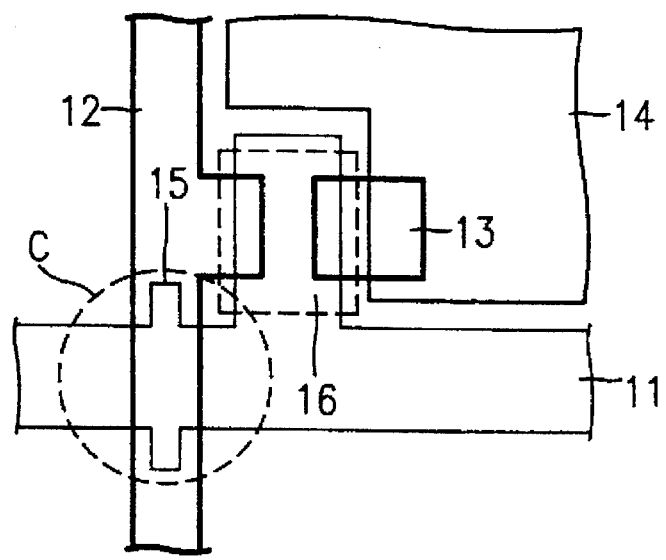
FIG. 4 is a layout view of a first embodiment of a liquid crystal display device according to the present invention.

Referring now in detail to the drawings for the purpose of illustrating preferred embodiments of the present invention, the liquid crystal display device as shown partially in FIG. 4, for example, includes a plurality of gate lines 11 for driving thin film transistors (TFTs), a plurality of data lines 12 arranged perpendicular to the gate lines 11 for supplying a data signal to the TFTs, a plurality of pixel electrodes 14 disposed in the pixel region formed between the gate lines 11 and data lines 12, a plurality of drain electrodes 13, and a semiconductor layers 16. The gate line 11 and the data line 12 are provided with a crossover portion C having a projecting part 15 disposed on the gate line 11.

The liquid crystal display device according to the present invention is prepared by the following process. Firstly, a metal material, such as Al, is deposited on a substrate to form a first metal layer. Then the first metal layer is selectively patterned using photolithography and etching to form the gate line 11. On the top surface of the first metal layer, a gate insulator layer (not shown) is deposited and the semiconductor layer 16 is formed on the active region of the TFT.

Thereafter, a metal material, such as Cr, is deposited on the top surface of the formed substrate to produce a second metal layer. Then the data line 12 and the drain electrode 13 are formed by selectively removing the second metal layer using photolithography and etching. Finally, the pixel electrode 14 is formed in the pixel region for providing connection with the drain electrode 13.

Thus, in the present invention, the gate line 11 is configured to provide the projecting part 15 at the crossover portion C so that the length of the edge of the gate line 11 at the crossover portion C is greater than the length of the edge of the gate line of the conventional liquid crystal display device at the crossover portion.

Figure 5:
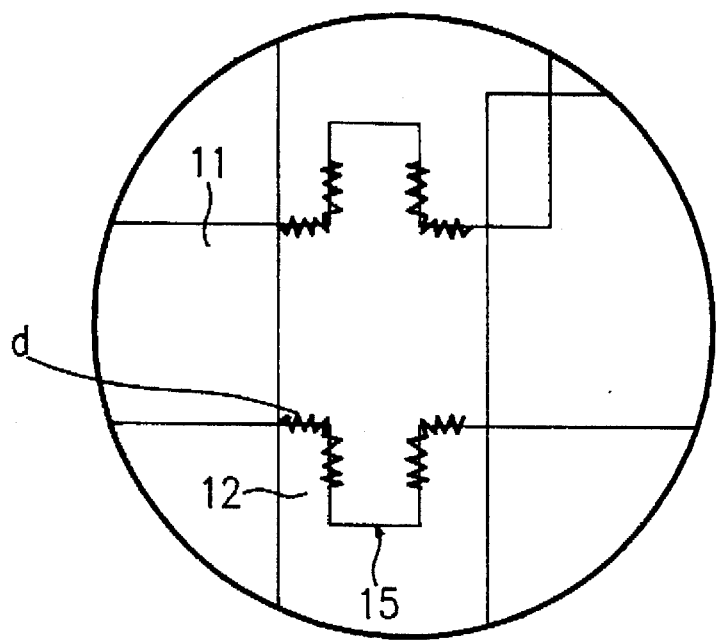
FIG. 5 is an enlarged view of a crossover portion C of a gate line and a data line shown in FIG. 4.

Furthermore, as shown in FIG. 5, the etchant can only seep into the data line 12 as much as the width of the data line 12 along the edge of the gate line 11, as shown by D. Due to the configuration of the projecting part 15, the length of the edge of the gate line 11 which crosses the data line 12 is greater than the width of the data line 12 at the crossover portion. Consequently, the projecting part 15 functions to prevent the severance of the data lines.

Moreover, a surface area of the gate line 11 which overlaps the data line 12 is increased due to the projecting part 15. Stress applied to the data line in the direction of the data line can be compensated because the projecting part 15 is projected in the direction parallel to the stress direction. Therefore, the gate line 11 at the crossover portion can effectively prevent the severance of the data line 12.

Figure 6:
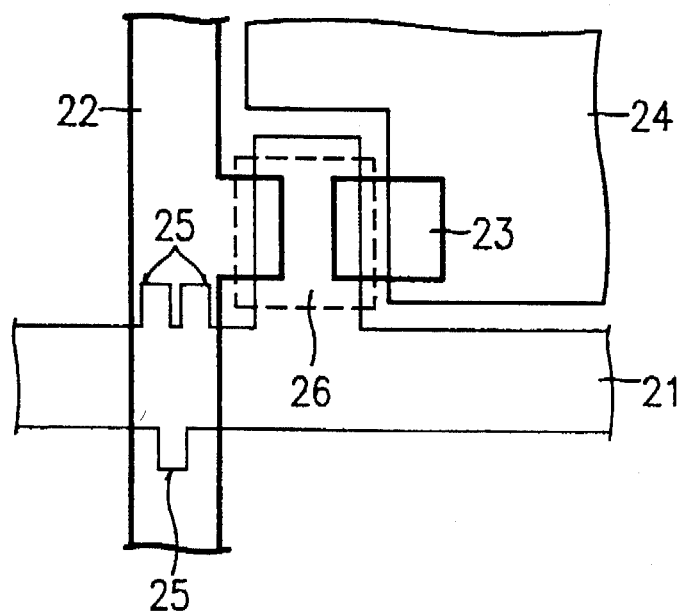
FIG. 6 is a layout view of a second embodiment of the liquid crystal display device according to the present invention.

Referring in detail to FIG. 6, there is illustrated a second embodiment of a liquid crystal display device in accordance with the present invention. As shown in FIG. 6, a gate line 21 and a data line 22 intersect each other the same way as the device of FIG. 4. The device of FIG. 6 also includes a pixel electrode 24 formed in the pixel region, a drain electrode 23 and a semiconductor layer 26. At the crossover portion, the gate line 21 is configured to provide a plurality of projecting parts 25. The length of the edge of the gate line 21 at the crossover portion is greater than the width of the data line 22 at the crossover portion, and a surface area of the gate line 21 overlapping the data line 22 is increased. Accordingly, the liquid crystal display device of the present invention prevents the severance of the data line 22 due to seepage of aconite, stress from defects in the metal, and stress from thermal expansion and thermal contraction.

Figure 7:
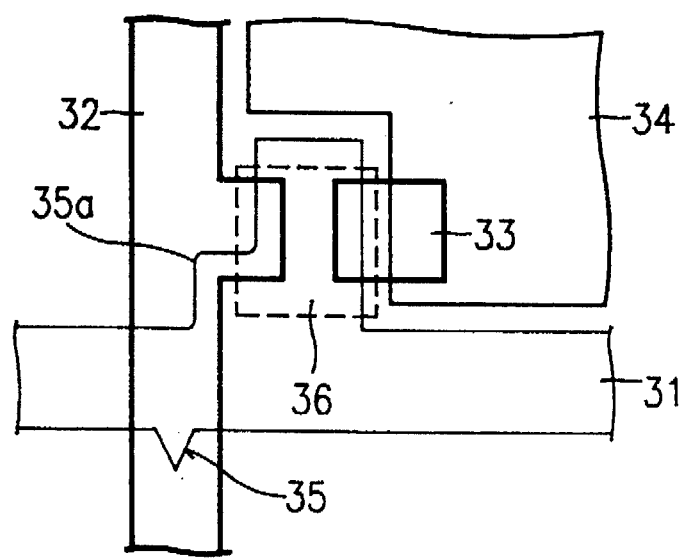
FIG. 7 is a layout view of a third embodiment of the liquid crystal display device according to the present invention.

Referring in detail to FIG. 7, there is illustrated a third embodiment of a liquid crystal display device according to the present invention. As shown in FIG. 7, a gate line 31 and a data line 32 intersects each other the same way as the device of FIG. 4. The device of FIG. 7 also includes a pixel electrode 34 formed in the pixel region, a drain electrode 33 and a semiconductor layer 36.

More specifically, the gate line 31 intersected by the data line 32 includes a first edge having a first projecting part 35 disposed thereon and a second edge having a second projecting part 35a. The second projecting part 35a overlaps the data line 32, following one corner edge of the data line 32 at the crossover portion. The length of the edge of the gate line 31 at the crossover portion is greater than the width of the data line 32 at the crossover portion, and a surface area overlapping the data line 32 is increased.

Accordingly, the liquid crystal display device of the present invention prevents the severance of the data line 32 due to seepage of etchant, stress from defects in the, metal material, and stress from thermal expansion and thermal contraction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following, claims.

What is claimed is:

1. A liquid crystal display device comprising:

a first conductor formed in a first direction;

a second conductor disposed over the first conductor in a second direction, forming a crossover portion; and wherein the first conductor includes:

preventing means for preventing disconnection of the second conductor at the crossover portion;

wherein the first and second conductors form a conductor pair; and wherein the device includes at least one such conductor pair.

2. A device as in claim 1, further comprising:

a thin film transistor adjacent to the crossover portion and a pixel electrode adjacent to the crossover portion.

3. A device as in claim 2, wherein:

the first conductor is a gate line and is formed on a substrate;

wherein an insulator layer is formed on the gate line; and wherein the second conductor is a data line formed on the insulator layer.

4. A device as in claim 1, wherein:

the preventing means has at least one edge configured such that at least a portion thereof is non-perpendicular to the second conductor at the crossover portion.

5. A device as in claim 1, wherein:

the preventing means has at least one edge configured such the at least one edge follows the contour of the second conductor at the crossover portion.

6. A device as in claim 1, wherein:

the preventing means has at least one edge configured such that a length of the edge is longer than a width of the second conductor at the crossover portion.

7. A device as in claim 1, wherein:

the preventing means has at least one edge configured such that the edge has at least one square-wave-shaped projection at the crossover portion.

8. A device as in claim 1, wherein:

the preventing means has at least one edge configured such that the edge has at least one triangularly-shaped projection at the crossover portion.

9. A device as in claim 1, wherein:

each conductor is a signal line.

10. A device as in claim 1, wherein:

the first conductor is a gate line and the second conductor is a data line.

11. A device as in claim 1, wherein:

the first conductor is a data line and the second conductor is a gate line.

12. device as in claim 1, wherein:

the preventing means has a first and second edge configured such that the first edge has a different shape than the second edge.

13. A device as in claim 1, wherein:

the projecting means includes a plurality of projecting parts projecting in the second direction.

14. A device as in claim 1, wherein the first direction is perpendicular to the second direction.

15. In a liquid crystal display device having at least one pair of first and second partially overlapping conductors, a method of configuring an edge of the first conductor where the first conductor is overlapped by the second conductor, the method comprising:

configuring, for at least one pair of first and second partially overlapping conductors, at least one edge of the first conductor such that a portion of the edge is non-perpendicular to the overlapping second conductor where the first conductor is overlapped by the second conductor.

16. A method as in claim 15, wherein:

the step of configuring configures a length of the edge of the first conductor to be longer than a width of the second conductor where the first conductor is overlapped by the second conductor.

17. A method as in claim 16, wherein:

the step of configuring configures the edge of the first conductor to have at least one square-wave-shaped projection.

18. A method as in claim 15, wherein:

the step of configuring configures the edge of the first conductor to have at least one triangularly-shaped projection.

19. A method as in claim 15, wherein:

the first conductor is a gate line and the second conductor is a data line.

20. A method as in claim 15, wherein:

the first conductor is a data line and the second conductor is a gate line.

21. A method as in claim 15, wherein:

the step of configuring configures, where the first conductor is overlapped by the second conductor, a first edge of the first conductor to have a different shape than a second edge of the first conductor.

22. A method as in claim 15, wherein:

each conductor is a signal line.

23. A method as in claim 15, wherein:

the step of configuring configures at least one edge of the first conductor to follow the contour of the overlapping second conductor where the first conductor is overlapped by the second conductor.

* * * * *